Feb. 1, 1966   E. A. GLASSEY   3,232,092
SERVO-TYPE PRESSURE REGULATOR
Original Filed Dec. 14, 1961
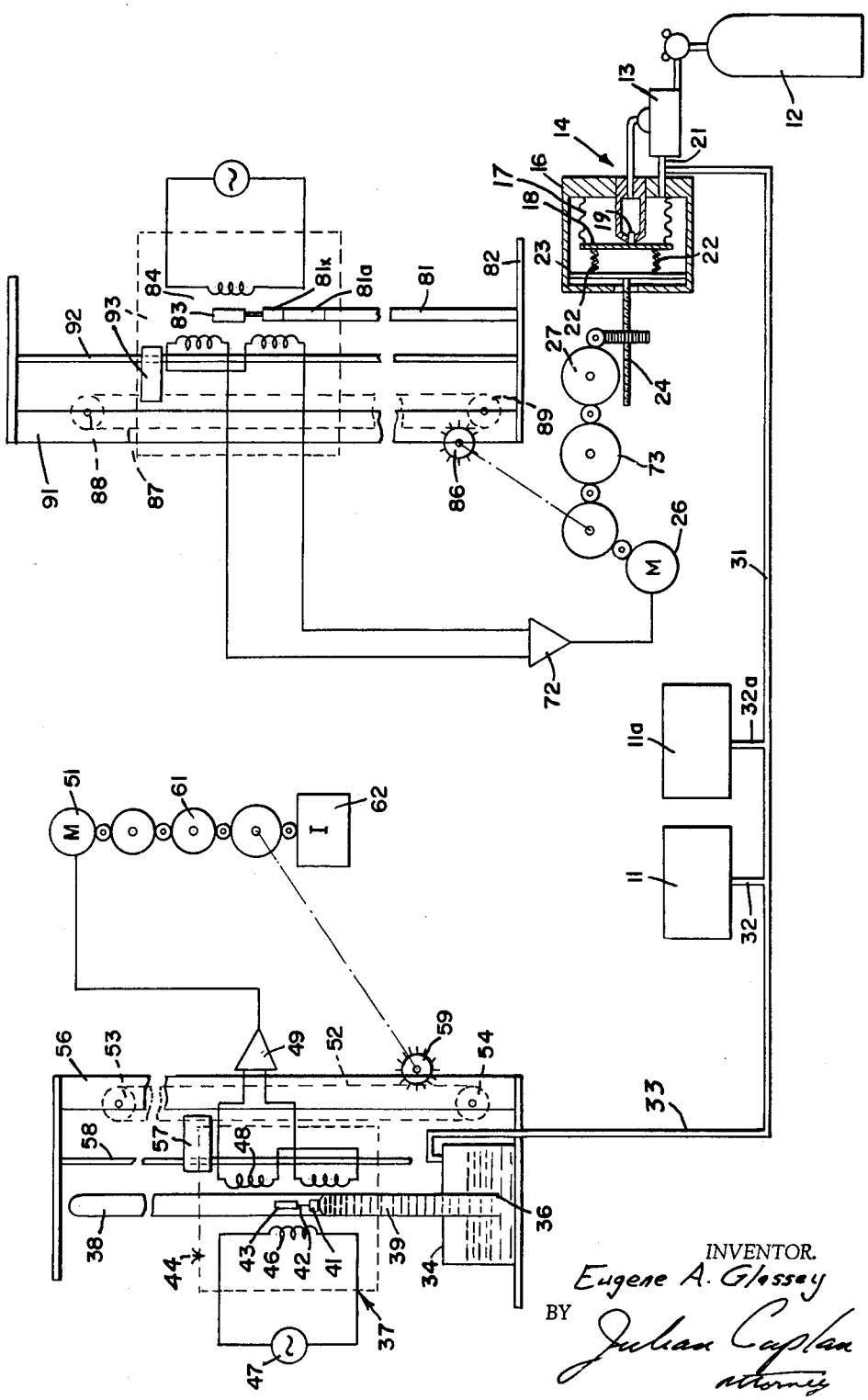
INVENTOR.
Eugene A. Glassey
BY Julian Caplan
attorney

United States Patent Office 3,232,092
Patented Feb. 1, 1966

3,232,092
SERVO-TYPE PRESSURE REGULATOR
Eugene A. Glassey, Los Altos, Calif., assignor to Exactel Instrument Company, Mountain View, Calif.
Original application Dec. 14, 1961, Ser. No. 159,371. Divided and this application Mar. 26, 1965, Ser. No. 452,962
6 Claims. (Cl. 73—4)

This application is a division of application Serial No. 159,371, filed December 14, 1961.

This invention relates to a new and improved servo-type pressure regulator and, more particularly, to a regulator which may be used to establish, for the purpose of calibrating and testing instruments, a series of predetermined pressures.

One important use of the present invention is in calibrating various pressure sensitive instruments, such as altimeters. Thus, a series of predetermined pressures may be established, which said pressures are indicated and controlled by the reading on a manometer. The instruments under test may then be calibrated by comparison with the reading of the test manometer. Similarly, readings of instruments may be tested by such comparison. Accordingly, the apparatus hereinafter described has for its principal purpose to regulate the pressure preferably at no flow at a series of different pressures which can be rapidly and conveniently reproduced to a very high order of accuracy. The present invention provides a simple, more economical, highly flexible apparatus which is very materially improved in these qualities over other apparatus currently used for similar purposes.

Another feature of the invention is the rapidity with which the pressure points are set up and established.

A still further feature of the invention is the fact that the instrument does not overshoot and come back to the preselected pressure. Overshooting is undesirable in the testing of certain instruments by reason of the effect of such overshooting and retraction on characteristics of the instruments, such as hysteresis of certain pressure sensing instruments, such as altimeters, mach-meters and air data computers.

A still further feature of the invention is the provision of means to add or subtract one or two points or counts to the reading to provide a manual adjustment to compensate for errors which may exist in the setting of the electrical components which determine the pressure points. Thus, the regulator may have a least unit of 0.001 inch of mercury and compensation may be made for plus or minus, one, two or three thousandths, or more, as selected.

An additional advantage of the present invention is the high gain or sensitivity made possible thereby which, in turn, makes possible great precision. Sensitivity, zero overshoot, and acceptable servo-performance in a system containing an exceptionally high inertia and elasticity makes conventional techniques for damping hunting unacceptable. The present invention provides an effective, simple, versatile means for accomplishing damping under the conditions stated.

A further advantage of the invention is that the manometer or other pressure sensor indicates actual pressure, independent of error in the regulator, and with an adjustable compensator control as above described. Any error at initial balance may be "zeroed out" or eliminated, leaving an absolutely accurate value of pressure, except for errors inherent in the manometer or other pressure sensor.

Still another feature of the invention is the fact that means is provided for continuous dial indication of the true pressure existing.

A still further feature of the invention is the avoidance of the use of any components which pose maintenance or procurement problems.

In a modified form of the invention the manometer or pressure sensor merely indicates pressure. The servo-motor actuating the pressure regulator is controlled by a differential transformer whose armature is selectively positioned at different elevations, the servo-motor also functioning to move the transformer so that its electrical center coincides with the position of the armature.

Other objects of the invention will become apparent upon reading the following specification and referring to the acccompanying drawing, in which the drawing comprises a schematic view of the electrical, pneumatic and mechanical elements of a device embodying the present invention.

Essentially, the present invention provides means for testing one or more instruments 11, 11a, or calibrating such instruments which are responsive to pressure over a range of predetermined pressure points. A source of gas, such has nitrogen gas under pressure is provided in tank 12 which is connected to the input 13 of an extremely accurate pressure regulator 14 of the type shown in U.S. Patents Nos. 2,359,236 and 2,501,957. Complete detailing of the characteristics of pressure regulator 14 is believed unnecessary in that this instrument is well understood in the art and its construction forms no part of the present invention. A casing 16 is provided which receives a diaphragm 17. Diaphragm 17 carries stem valve 18 which moves toward and away from an orifice plate 19 connected to input 13 of the regulator. The output 21 of the regulator is on the opposite side of orifice 19. Thus, as diaphragm 17 is moved toward and away from orifice plate 19, the opening through which the source of pressure passes is controlled to maintain a constant pressure at outlet 21. The diaphragm 17 is biased toward orifice plate 19 by means of spring 22, which in the present case is mounted on a spring mounting plate 23 which is attached to lead screw 24 controlled by servo-motor 26. Servo-motor 26 has a pinion 27 which drives lead screw 24. Control of servo-motor 26 is an important feature of the present invention and is hereinafter described in detail. However, it will be noted that as the motor is energized in opposite directions the pressure controlled by regulator 14 is varied.

The output 21 of pressure regulator 14 leads to a manifold 31. Various ports 32, 32a of manifold 31 are connected to one or more instruments 11, 11a under test. Another port of manifold 31 is connected by means of flexible tubing 33 to the cover 34 of cistern 36 of manometer 37. A manometer tube 38 extends up from cistern 36 and is filled with a liquid 39, such as mercury to counter-balance the pressure at the top of cistern 36. On the top of the liquid column 39 is a float 41 which is connected by means of stem 42 to armature 43 received in the core of differential transformer 44. The input coil 46 of transformer 44 is connected to a source 47 of alternating current. The secondary 48 of the differential transformer is fed into a conventional servo-amplifier 49 and the output of amplifier 49 is fed into a conventional second servo-motor 51. Servo-motor 51 is arranged to mechanically move the differential transformer 44 relative to the manometer column 38 so that the transformer 44 is centered relative to armature 43. Various means may be used to move transformer 44. One preferred means uses a perforated metal tape 52 which passes around pulleys 53, 54 at the top and bottom of the support column 56 for tube 38 and has its ends secured to slider 57 which slides on vertical guide 58 adjacent column 56. Transformer 44 is mounted on slider 57. A pinion sprocket 59, having pins fitting into the perforations of tape 52, is driven by motor 51 through gear train 61.

Motor gear train 61 also controls the dials of an indicator 62, which indicator indicates the pressure in the head of cistern 36. It will be noted that the pressure indicated by indicator 62 is likewise the pressure in the instruments 11, 11a under test.

Although the foregoing is an efficient and desirable arrangement, it will be understood that any manometer or pressure sensor which produces an output voltage or shaft position variation may be used. The term "manometer" is used in a general sense to include barometers.

In the form of the invention shown in the drawing, servo-motor 51 drives sprocket 59 and indicator 62 but has no other function. Servo-motor 26, which drives regulator 14, is energized by amplifier 72. To provide the several pressure points, gauge blocks 81, 81a, 81x, such as Johansson blocks, are mounted in a column above base 82. Armature 83 is positioned above the uppermost block and is received in the core of differential transformer 84, the output of which energizes amplifier 72. Servo-motor 26 is used to move transformer 84 so that it is electrically centered relative to armature 83. The means illustrated comprises a sprocket 86 driven by motor 26 and meshing with perforated tape 87 which passes around pulleys 88 and 89 at the top and bottom of second support column 91 on base 82. The ends of tape 87 are fixed to slider 93 which slides along guide 92 (likewise on base 82) which carries transformer 84.

In this form, the gauge blocks 81, 81a . . . 81x are added to or subtracted from base 82, each increment resulting in a different pressure in the system. Thus, the position of armature 83 determines the position of transformer 84, since it controls motor 26. Motor 26 also varies the pressure in conduit 31 or instruments 11, 11a. Such pressure is also sensed by manometer 38 or equivalent means and read on indicator 62. Hence, the series of gauge blocks can be selected to establish the various desired pressures.

It will be understood that, although not illustrated in the circuit, damping means to eliminate "hunting" and a compensator for small errors in pressures may be installed in the circuit of the input of amplifier 72 in the same manner as in applicant's copending application, Serial No. 159,371, filed December 14, 1961.

It will be further understood that references for height other than gauge blocks may be employed, examples including verniers, adjustable stops, etc.

Although the foregoing invention has been described in some detail, by way of illustration and example for purposes of clarity of understanding it is understood that certain changes and modifications may be practiced within the spirit of the invention and scope of the appended claims.

What is claimed is:

1. Apparatus for regulating pressure at a plurality of pre-selected points comprising
   a source of fluid under pressure,
   a pressure regulator connected to said source,
   first means for adjusting the pressure at the outlet of said regulator, said first means comprising an armature, second means for varying the position of said armature in pre-selected increments, said second means comprising a plurality of gauge blocks, a differential transformer having a hollow core to receive said armature, and means driven by a servo motor to move the position of said transformer to center said transformer electrically relative to said armature,
   a conduit connected to said regulator,
   a pressure sensitive instrument connected to said conduit and having indicator means for indicating pressure in said conduit,
   a servo-motor arranged to actuate said first means, and an electrical circuit arranged to energize said servo-motor, said electrical circuit comprising a source of signal voltage and adjustable means for dividing voltage from said source, whereby by adjustment of said adjustable means said pressure regulator may be adjusted to establish in said conduit a plurality of pre-selected pressures, said pressures being indicated on said indicator means.

2. Apparatus for regulating pressure at a plurality of pre-selected points comprising
   a source of fluid under pressure,
   a pressure regulator connected to said source,
   first means for adjusting the pressure at the outlet of said regulator, said first means comprising an armature, a differential transformer having a hollow core to receive said armature, second means for varying the position of said armature in pre-selected increments, said second means comprising a reference base and third means supporting said armature at varying pre-selected distances from said reference base,
   a conduit connected to said regulator output,
   pressure indicator means connected to said conduit, and
   a servo-motor connected to the output of said differential transformer, said servo-motor arranged to actuate said first means.

3. Apparatus according to claim 2 in which said third means comprises a plurality of gauge blocks.

4. Apparatus according to claim 2 which further comprises,
   fourth means driven by said servo-motor to move the position of said transformer to center said transformer relative to said armature.

5. Apparatus according to claim 4 in which said fourth means comprises
   a sprocket driven by said servo-motor,
   pulley means connected to said sprocket,
   means connecting said differential transformer to said pulley means to move said transformer according to movement of said servo-motor.

6. Apparatus for regulating pressure at a plurality of pre-selected points comprising,
   a source of fluid under pressure,
   a pressure regulator connected to said source,
   a differential transformer,
   a servo-motor electrically connected to the output of said differential transformer, said servo-motor adjusting pressure at the outlet of said pressure regulator,
   an armature fitting within said differential transformer to vary said output of said transformer according to the position of said armature within said transformer,
   a reference base relative to said armature,
   means for supporting said armature at varying pre-selected distances from said reference base,
   feedback means driven by said servo-motor to move said transformer to center said transformer relative to said armature.

References Cited by the Examiner

UNITED STATES PATENTS

| | | | |
|---|---|---|---|
| 2,649,750 | 8/1953 | Burgess | 73—4 |
| 2,893,236 | 7/1959 | Coon et al. | 73—4 X |

LOUIS R. PRINCE, *Primary Examiner.*